Figure 1:
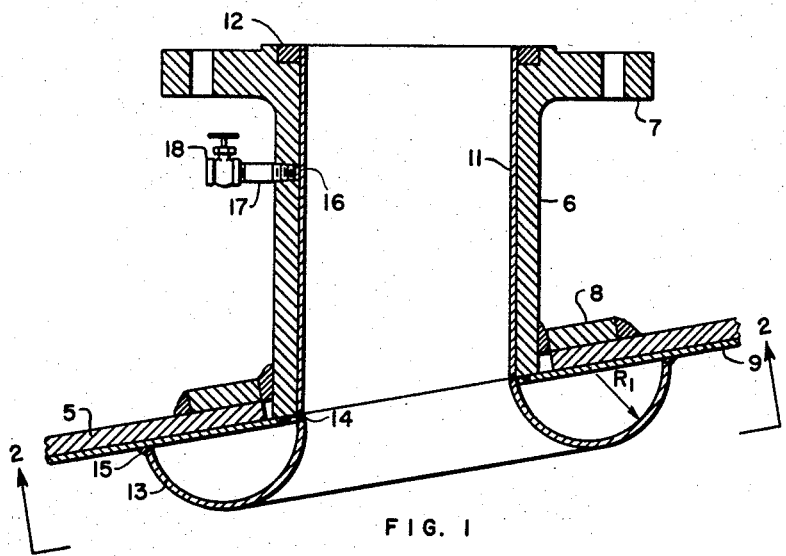

Dec. 8, 1959     H. G. ROLLINS ET AL     2,916,182
LINED TUBE AND PLATE CONNECTION
Filed Nov. 12, 1957

INVENTORS:
HARRY G. ROLLINS
MILFORD S. WALLER
BY: *Oswald H. Milmore*
THEIR ATTORNEY United States Patent Office 2,916,182
Patented Dec. 8, 1959

2,916,182

LINED TUBE AND PLATE CONNECTION

Harry G. Rollins and Milford S. Waller, East Alton, Ill., assignors to Shell Development Company, New York, N.Y., a corporation of Delaware Application November 12, 1957, Serial No. 695,690

4 Claims. (Cl. 220—63)

The invention relates to a lined flow connection between a tube and a plate suitable for service wherein severe temperature variations occur. The invention may be applied, for example, to pressure vessels, wherein the plate is the vessel wall and the tube is a nozzle connected to an opening in the wall. The invention may be applied, for example, to thermal coking units in petroleum refineries.

It is known to protect such tubes and plates with linings of special metal or alloys to protect the base metals of the tubes and plates against attack, such as corrosion or erosion from aggressive media. However, thermal cycling of equipment which is lined with a metal different from that of the plate and tube results in bulging and is often of sufficient severity to result in early rupture of the metal linings, particularly of the parts thereof situated near the junction of the tube and the plate.

Prior designs of linings which sought to alleviate this difficulty were not fully effective. According to the construction shown in U.S. Patent No. 2,136,474, the cylindrical lining section within the nozzle is anchored only at the outer end of the nozzle and the inner end is fixed to an annular lining disc which joins the cylindrical lining section at right angles and is in engagement with the inner surface of the vessel wall; this was found in practice to have insufficient service life and failure of the lining was due to high concentration of tensile or compressive as well as bending stresses at the junction of the cylindrical section and the disc, where insufficient flexibility is provided. Similarly, in the construction according to U.S. Patent No, 1,992,470 the cylindrical lining section is joined substantially at right angles to the annular lining section connecting it to the main lining of the vessel, and again high tensile or compressive stresses as well as bending moments are concentrated at the junction of these parts, resulting in short service life.

It is the object of the invention to provide an improved connection between a plate and tube wherein the lining is arranged in such a way as to afford increased flexibility, especially of the parts near the juncture of the tube and plate, thereby to avoid the high concentrations of stress and prolonging the service life of the lining.

According to the invention the tube, which is connected about an opening in a lined plate, contains a cylindrical protective metal lining section which is fixed thereto only at the outer end of the tube; the inner end of the lining is connected to the plate lining by an annular lining section which has the inner margin thereof fixed to the said cylindrical lining section in such a relation as to extend in substantially the same direction, e.g., to be tangential to the cylindrical section, the outer margin of the annular section being fixed to the plate lining and the intermediate part of the annular section being free for movement both toward and away from the plate, i.e., it is mounted with a clearance between it and the plate (or the plate lining, when this extends beneath the annular section). In the preferred construction the said annular section is in the shape of a semi-circular torus.

By this construction the stresses at and near the juncture of the cylindrical lining section and annular lining section are greatly reduced and the annular section is afforded sufficient flexibility to prolong significantly the service life of the lining.

Figure 2:
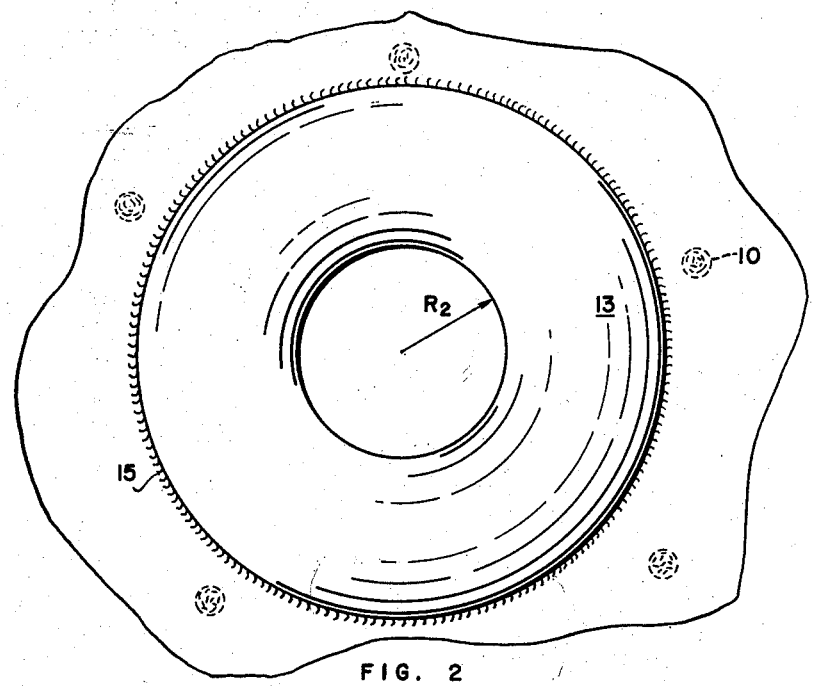

The invention will be further described with reference to the accompanying drawing forming a part of this specification and showing one preferred embodiment by way of illustration, wherein:

Figure 1 is a fragmentary sectional view through a vessel wall, showing the tubular connection and the lining; and Figure 2 is an interior plan view of the connection, viewed as indicated by the line 2—2 of Figure 1.

The vessel has a wall 5, herein also called the plate, which carries a nozzle or tube 6 mounted at an opening in the wall. The nozzle has coupling means, such as a bolting flange 7 at its outer end, and is secured to the wall by weldments between the nozzle and a reinforcing ring 8 which is welded to the wall. The wall and nozzle may be of any suitable metal, such as carbon steel.

The inner surface of the wall is covered by a lining 9 of suitable protective metal, such as a corrosion-resistant metal or metal alloy, which conforms to the contour of the wall and is fastened to the wall, e.g., by spot welds 10. The nozzle contains a cylindrical lining section 11, made of similar protective metal or metal alloy, which is fixed to the nozzle in sealed relation only at the outer end thereof, e.g., by welding as shown at 12 around the periphery of an annular recess in the flange 7. The inner end of this lining section is free to move in the direction of the nozzle axis upon thermal changes. An annular lining section 13, preferably shaped as a semi-circular torus, formed of similar protective metal or metal alloy and thin enough to undergo flexure, is welded at the inner margin thereof to the cylindrical lining section 11, e.g., be a butt-weld as shown at 14, and is welded at the outer margin thereof to the lining 9, as shown at 15.

It will be noted that the part of the annular lining section 13 between the inner and outer margins thereof is spaced from the vessel wall and from the lining 9, whereby it is free to move toward and away from the wall. Moreover, the inner part of the annular section, immediately adjoining the weld 14, extends into the vessel in prolongation of the cylindrical section 11. By this construction stresses at the weld 14 are greatly reduced.

The nozzle is preferably further provided with a weep hole 16 to which is connected a nipple 17 and a valve 18, to establish communication from the outside with the annular space between the nozzle and the cylindrical lining section.

For good flexibility it is advantageous that the small radius $R_1$ of the torus be at least one-third of the radius of the inner margin, indicated $R_2$ in the drawing. By way of example, with a nozzle having an internal diameter of six inches ($R_2=3$ inches) a lining wherein $R_1$ was 2 inches was found to prolong the operating life of the lining several fold in comparison to conventional linings.

As is evident from the drawing, the term "semi-circular torus" is used to denote a shape generated by a semi-circle, or, stated otherwise, by cutting a circular torus in half on its equatorial plane. The invention is not, however, limited to annular lining sections which conform exactly to this geometric preferred shape. Further, it is noted that the shape of the inner margin need not conform to a circle; thus, as shown, the section 13 is oblique to the nozzle and the weld 14 is consequently slightly eliptical.

We claim as our invention:

1. A lined flow connection between a tube and a plate comprising: a plate having an opening therethrough; a lining on the inner surface of the plate surrounding said opening; a short tube fixed at its inner end to the plate surrounding said opening and extending outwards from the outer plate surface, said tube having coupling means at the outer end thereof; a cylindrical lining section situated within said tube, anchored at the outer end of the tube, and extending inwardly substantially through the plate opening, the inner end of said lining section being movable in the axial direction of the tube upon thermal change; and an annular lining section curved throughout in cross-section having the inner margin thereof fixed to the inner end of the cylindrical lining section and the outer margin thereof fixed to the first-mentioned lining, the part of the annular lining section between said inner and outer margins being free for movement toward and away from the plate and the part immediately adjoining the cylindrical lining section extending initially substantially in a direction in prolongation of the cylindrical lining section and continuing all about the tube so as to make a substantial reversal in direction before joining the said first-mentioned lining.

2. A connection according to claim 1 wherein said annular lining section is shaped substantially as a semi-circular torus having the said inner margin tangential to the cylindrical lining section and the said outer margin substantially perpendicular to the first-mentioned lining.

3. A connection according to claim 2 wherein small radius of the torus is at least one-third of the radius of the said inner margin thereof.

4. A lined flow connection between a nozzle and a vessel comprising: a vessel having an enclosing wall with an opening therethrough; a lining on the inner surface of said wall surrounding said opening; a nozzle welded at its inner end to the said wall surrounding said opening and extending outwards from the vessel, said nozzle having coupling means at the outer end thereof; a cylindrical lining section situated within said nozzle, welded in sealed relation to the outer end of the nozzle, and extending inwardly substantially through the wall opening, the inner end of said lining section being movable in the axial direction of the nozzle upon thermal change; and a substantially semi-circular torus-shaped lining section having the inner margin thereof welded to the inner end of the cylindrical lining section so as to extend into the vessel substantially tangentially to the cylindrical section, having the outer margin thereof welded to the first-mentioned lining, and the part between said margins being free for movement toward and away from the vessel wall.

References Cited in the file of this patent

UNITED STATES PATENTS

| | | |
|---|---|---|
| 1,992,470 | Carlstrom | Feb. 26, 1935 |
| 2,625,297 | Koppel | Jan. 13, 1953 |
| 2,136,474 | Straty | Nov. 15, 1958 |